United States Patent
Ohira

(10) Patent No.: US 7,166,043 B2
(45) Date of Patent: Jan. 23, 2007

(54) GOLF BALL

(75) Inventor: Takashi Ohira, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 67 days.

(21) Appl. No.: 10/915,942

(22) Filed: Aug. 9, 2004

(65) Prior Publication Data

US 2006/0030428 A1    Feb. 9, 2006

(51) Int. Cl.
*A63B 37/12*    (2006.01)
(52) U.S. Cl. ..................................... 473/378
(58) Field of Classification Search ............... 473/378, 473/351
See application file for complete search history.

(56) References Cited

U.S. PATENT DOCUMENTS

| 5,766,097 A | 6/1998 | Horiuchi et al. |
| 5,967,906 A | 10/1999 | Horiuchi et al. |
| 2004/0254032 A1* | 12/2004 | Lutz et al. ................. 473/378 |

* cited by examiner

*Primary Examiner*—Haeann Gorden
(74) *Attorney, Agent, or Firm*—Sughrue Mion,

(57) ABSTRACT

A golf ball with a large number of dimples and a coating film formed on its surface, which is characterized in that said coating film is formed from a coating material incorporated with fine silica powder having an average particle diameter no larger than 200 nm. The fine silica power has no adverse effect on the color and clarity of the coating film, and the coating material gives a uniform coating film which retains good clarity, gloss, and film properties.

11 Claims, 1 Drawing Sheet

GOLF BALL

BACKGROUND OF THE INVENTION

The present invention relates to a golf ball having its surface covered with a top coat layer of clear coating material. More particularly, the present invention relates to a golf ball having a top coat layer which remains clear and glossy and retains good coating performance for a long period of time.

Golf balls usually have a white enamel coating and a clear top coating, which give a clear, glossy surface for their good appearance.

Recently, golf balls without white enamel coating are spreading to meet requirements for their simplified manufacturing process. As a result, the top coat layer of clear coating material is required to be more uniform than before. Unfortunately, it is possible to form uniform coating film on the surface of golf balls but it is impossible to prevent the coating film from fading with time, so long as the coating material contains a conventional extender pigment such as silica and calcium carbonate.

The clear coating material tends to become poor in clarity because of the clay-based anti-sagging agent added thereto which is usually a natural product containing considerable impurities (although an artificial one is available in small quantities). On the other hand, wax-based anti-sagging agents are likely to adversely affect the properties and adhesion of the coating film.

U.S. Pat. No. 5,766,097 and U.S. Pat. No. 5,967,906 disclose a golf ball having a plurality of dimples on its surface coated with a top coat of urethane coating material and/or epoxy coating material which is incorporated with silica, clay, or calcium carbonate having a particle diameter no larger than 20 μm, preferably no larger then 10 μm.

However, even the golf ball mentioned above does not have a good appearance because of the unsatisfactory clarity and gloss of the coating film.

SUMMARY OF THE INVENTION

The present invention was completed in view of the foregoing. It is an object of the present invention to provide a golf ball covered with a coating film which permits clear top coating to be formed thereon uniformly to give a good appearance, without adverse effect on color tone and clarity and coating properties.

In order to achieve the above-mentioned object, the present inventor carried out a series of investigation, which led to the finding that a coating material incorporated with fine silica having an average particle diameter in the order of nanometer yields a coating film which permits durable clear top coating to be formed thereon uniformly, without adverse effect on color tone and clarity and coating properties. The present invention is based on this finding.

The present invention provides a golf ball specified as follows.

[1] A golf ball having a large number of dimples and a coating film formed on its surface, which is characterized in that the coating film is formed from a coating material incorporated with fine silica particle having an average particle diameter no larger than 200 nm.

[2] A golf ball as defined in [1] above, wherein the fine silica particle has an average particle diameter no larger than 100 nm.

[3] A golf ball as defined in [1] above, wherein the fine silica particle has an average particle diameter no larger than 50 nm.

[4] A golf ball as defined in [1] above, wherein the coating material contains the fine silica particle in an amount less than 30 wt % of the solid resin component in the coating material.

[5] A golf ball as defined in [1] above, wherein the fine silica particle is colloidal silica dispersed in an organic solvent.

[6] A golf ball as defined in [1] above, wherein the coating material is two-pack urethane of cure type.

[7] A golf ball as defined in [1] above, wherein the coating material is two-pack urethane of cure type composed of a polyol and a non-yellowing polyisocyanate, the polyol consisting mainly of hydroxyl group-containing polyester polyol having the alicyclic structure in its molecule.

[8] A golf ball as defined in [1] above, wherein the coating material is two-pack urethane of cure type composed of a polyol and an elastic-modified polyisocyanate, the polyol consisting mainly of acrylic polyol.

DESCRIPTION OF THE PREFERRED EMBODIMENTS

Figure 1:
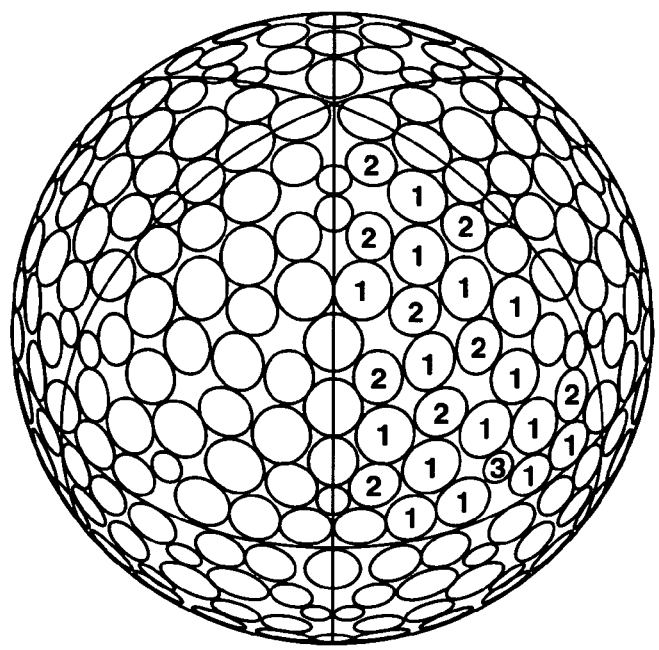
FIG. 1 is a plan view of a golf ball showing the dimples used in one example of the present invention.

The golf ball according to the present invention is characterized by its coating film formed from a coating material incorporated with fine silica particle having an average particle diameter no larger than 200 nm.

The coating material mentioned above may be any known clear coating material to be applied to the outermost covering layer on the surface of the golf ball. The function of the clear coating material is to protect the golf ball entirely and to impart a gloss and good appearance to the surface of the golf ball. To be specific, the clear coating material is two-pack urethane of cure type, which should preferably be either one which is composed of a polyol and a non-yellowing polyisocyanate, the polyol consisting mainly of hydroxyl group containing polyester polyol having the alicyclic structure in its molecule, or one which is composed of a polyol consisting mainly of acrylic polyol and an elastic-modified polyisocyanate.

Two-Pack Urethane of Cure Type which is Composed of a Polyol and a Non-Yellowing Polyisocyanate, the Polyol Consisting Mainly of Hydroxyl Group-Containing Polyester Polyol Having the Alicyclic Structure in its Molecule The term "hydroxyl group-containing polyester polyol having the alicyclic structure in its molecule" is defined as a polyester polyol obtained by reaction between a polyhydric alcohol having the alicyclic structure in its molecule and a polybasic acid having the alicyclic structure in its molecule. Preferred examples of the former include such diols as 1,3-cyclohexanedimethanol and 1,4-cyclohexanedimethanol and their mixtures. Preferred examples of the latter include such dicarboxylic acids as tetrahydrophthalic acid, hexahydrophthalic acid, 1,3-cyclohexanedicarboxylic acid, and 1,4-cyclohexanedicarboxylic acid, and their acid anhydrides, acid halides, and mixtures.

The above-mentioned polyhydric alcohol and polybasic acid, both having the alicyclic structure in their molecule, may constitute partly or entirely the hydroxyl group-containing polyester. The polyhydric alcohol having the alicyclic structure in its molecule should account for no less than 3 wt %, preferably 5 to 40 wt %, in the total amount of the polyhydric alcohol. The polybasic acid having the alicyclic structure in its molecule should account for no less than 5 wt %, preferably 10 to 55 wt %, in the total amount of the polybasic acid. If the amount of these two components is above or below the limits mentioned above, the resulting coating film on the golf ball is poor in resistance to sand abrasion and resistance to stain with sap.

The polyhydric alcohol having the alicyclic structure in its molecule may be used in combination with an ordinary polyhydric alcohol, such as ethylene glycol, diethylene glycol, triethylene glycol, propylene glycol, dipropylene glycol, butylene glycol, 1,6-hexanediol, neopentylglycol, 3,3-dimethylolheptane, polyethylene glycol, polypropylene glycol, glycerin, trimethylolethane, trimethylolpropane, and pentaerythritol, and mixtures thereof.

The polybasic acid having the alicyclic structure in its molecule may be used in combination with an ordinary polybasic acid, such as dicarboxylic acids including adipic acid, sebacic acid, dimer acid, phthalic acid, isophthalic acid, terephthalic acid, maleic acid, fumaric acid, and itaconic acid, and their acid anhydrides, acid halides, and mixtures.

As mentioned above, the hydroxyl group-containing polyester is obtained by esterification reaction between the polyhydric alcohol and the polybasic acid. It should preferably have a weight-average molecular weight of 3,000 to 35,000 (measured by GPC) and a hydroxyl number of 50 to 300, particularly 150 to 250. If these requirements are not met, the resulting coating film on the golf ball is poor in resistance to sand abrasion and resistance to stain with sap.

The non-yellowing polyisocyanate includes, for example, hexamethylene diisocyanate, isophorone diisocyanate, and hydrogenated xylene diisocyanate, and mixture thereof, in adduct form, biuret form, or isocyanurate form.

The hydroxyl group-containing polyester and the non-yellowing polyisocyanate should preferably be used in such an amount that the molar ratio of hydroxyl groups in the former to isocyanate groups in the latter is in the range of 0.8 to 1.3.

Two-Pack Urethane of Cure Type Composed of a Polyol and an Elastic-Modified polyisocyanate, the Polyol Consisting Mainly of Acrylic Polyol The term "acrylic polyol" is defined as a polyol consisting of the main chain of acrylic polymer and the side chain of polyester and/or polyether.

The acrylic polymer is not specifically restricted in its structure. Any structure is acceptable so long as the basic skeleton is made up of repeating units of acrylic monomer. The main chain may be formed from one or more than one kind of acrylic monomer. The acrylic monomer may be copolymerized with any other copolymerizable monomer.

The polyester and polyether constituting the side chain should preferably be one which is represented by the following structural formula (in which R, R', and R" denote $C_{1-12}$ alkylene groups, and n denotes an integer of 1 to 20, and m denotes an integer of 1 to 40).

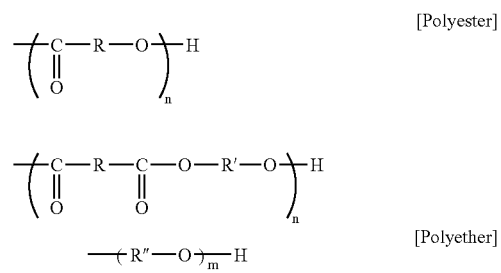

Examples of the acrylic polyol are listed below.
(i) One consisting of the main chain of acrylic polymer and the side chain of lactone or alkylene oxide.
(ii) One consisting of the main chain of acrylic polymer and the side chain which is grafted to the main chain by polymerization of monomer in the presence of acrylic polymer with the help of an initiator.
(iii) One formed by homopolymerization of acrylic monomer having polyester added thereto and/or acrylic monomer having polyether added thereto. (The former monomer is referred to as polyester-containing acrylic monomer, and the latter monomer is referred to as polyether-containing acrylic monomer.)
(iv) One formed by copolymerization of polyester-containing acrylic monomer and/or polyether-containing acrylic monomer with another acrylic monomer.

The term "elastic-modified polyisocyanate" is defined as an NCO-terminated prepolymer which is formed by urethane reaction between diisocyanate as a monomer and an elastic active hydrogen-containing compound. The diisocyanate includes tolylene diisocyanate (TDI), xylene diisocyanate (XDI), diphenylmethane diisocyanate (MDI), and isophorone diisocyanate (IPDI). Incidentally, the urethane reaction may be carried out under ordinary conditions without any specific restrictions.

The elastic active hydrogen-containing compound used for elastic modification of polyisocyanate includes polyester polyol, polycarbonate polyol, polyether polyol, polyolefin polyol, and vegetable-derived polyol, and their copolyols. The two-pack urethane of cure type should preferably contain the polyisocyanate modified with at least one species of the above-mentioned polyols. These polyols should preferably have a Tg lower than 0° C. so that the resulting coating film has good resilience and improved impact resistance. Incidentally, these polyols may be used alone or in combination with one another.

The above-mentioned clear coating material may be replaced by any other coating material such as enamel coating material incorporated with a pigment or a processed pigment.

The above-mentioned coating material will produce its effect remarkably if it is applied onto a golf ball which has undergone dry surface treatment such as corona treatment, plasma treatment, UV irradiation treatment, and electron beam irradiation treatment. Plasma treatment is most desirable.

The above-mentioned coating material may be applied to the surface of a golf ball in the usual way, such as brushing, spraying, and electrostatic coating. The thickness of the coating film should be 5 to 50 μm, preferably 10 to 30 μm.

The edge ratio (%) of the coating film should be no lower than 50%, preferably no lower than 70%. The edge ratio is an index to evaluate the uniformity of the coating film.

The above-mentioned coating material contains fine silica particle, which has an average particle diameter no larger than 200 nm, preferably no larger than 100 nm, more preferably no larger than 50 nm, and most desirably no larger than 20 nm, measured by BET method. The fine silica particle having an average particle diameter in the order of nanometer helps form a coating film which permits clear top coating to be formed thereon uniformly, while retaining clarity and gloss on the ball surface. Presumably, this effect is produced by the following mechanism. Silica particles with a much smaller average particle diameter than ordinary ones having an average particle diameter in the order of micrometer hardly form surface irregularities on the coating film. In addition, particles smaller than the wavelength of visible light do not affect the color tone. Thus, the resulting coating film makes no visual change. This is one of the significant advantage of the present invention.

The fine silica powder should be organosilica sol, which is a colloidal solution prepared by dispersing colloid silica having an average particle diameter no larger than 200 nm in an organic solvent such as alcohol, ketone, and ester. It is desirable from the standpoint of dispersibility into an ordinary coating material. Its typical example is organosilica sol available from Nissan Chemical Industries, Ltd.

The amount of the fine silica particle should be no less than 4 wt %, preferably no less than 5 wt %, of the total amount of solids in the coating material. With an amount less than the lower limit mentioned above, the resulting coating material will not give a coating film of uniform thickness. Also, the amount of the fine silica particle should be less than 30 wt %, preferably less than 25 wt %, of the total amount of solids in the coating material. With an amount more than the upper limit mentioned above, the resulting coating material cannot cover excess silica particles and hence yields a coating film which is poor in gloss due to surface irregularities.

The golf ball according to the present invention consists of a core and at least one layer covering the core. The cover layer may consist of two or three layers. In this case, at least the outermost cover layer should have the properties specified later. The core is not specifically restricted and it may be formed from any ordinary material.

The cover layer should have a Shore hardness D of 35 to 70, preferably 40 to 65. With an excessively low hardness, the resulting golf ball is poor in resilience and scratch resistance. With an excessively high hardness, the resulting golf ball is poor in the feel of hit and does not produce the desired spin effect. The thickness of the cover layer is usually 0.5 to 3 mm.

The cover layer mentioned above may be formed from a thermoplastic resin which is commonly used as a covering material for golf balls. Examples of the thermoplastic resin include ionomer resin, polyester elastomer, and polyurethane elastomer, and a mixture thereof. Of these examples, an ionomer resin is desirable.

The covering material may be selected from commercial ones. Commercial ionomer resins include, for example, Himilan 1605, Himilan 1706, Himilan 1707, Himilan AM7315, Himilan AM7311, and Himilan AM7318 (all from DuPont-Mitsui Polychemicals Co., Ltd.); Surlyn 7930 and Surlyn 6320 (from E.I. DuPont de Nemours & Company Inc.), and Nucrel AN4311. Commercial polyester elastomers include, for example, Hytrel 4047 and Hytrel 4767 (from DuPont-Toray Co., Ltd.).

On the surface of the outermost cover layer are formed dimples. Dimples are not specifically restricted in shape, depth, diameter, arrangement, and number. Any known dimples may be formed. For example, the surface may be covered with one kind of circular dimples as viewed from above or more than one kind of circular as viewed from above dimples differing in diameter and/or depth.

The golf ball according to the present invention is not specifically restricted in other factors so long as it meets the above-mentioned requirements. It may be a two-piece solid golf ball, a multi-piece solid golf ball (consisting of three or more layers), a thread-wound golf ball, or a golf ball of any kind. The golf ball according to the present invention may be produced in the usual way from any known material. The weight and diameter of the golf ball should be properly established according to golf rules. In other words, the diameter should be no smaller than 42.67 mm, and the weight should be no more than 45.93 g.

As explained above, the golf ball according to the present invention is coated with a coating material incorporated with fine silica particle having an average particle diameter in the order of nanometer. This coating material-yields a coating film which permits the clear coating to be formed thereon uniformly without adverse effect on color tone, clarity, gloss, and film properties.

EXAMPLES

The invention will be described in more detail with reference to Examples and Comparative Examples, which are not intended to restrict the scope thereof.

Examples 1 to 4 and Comparative Examples 1 and 2

A solid core (38.5 mm in diameter) was formed by compression molding with heating from a rubber compound of the following formulation which had been mixed by roll milling. It is noted that the following term "pbw" means parts by weight.

<Rubber Compound>

| | |
|---|---|
| Cis-1,4-polybutadiene | 100 pbw |
| Zinc acrylate | 24 pbw |
| Zinc oxide | 19 pbw |
| Antioxidant | 1 pbw |
| Dicumyl peroxide | 1 pbw |

The resulting core was covered with an ionomer resin by injection molding. The ionomer resin is Himilan 1605 having a Shore D hardness of 65, from DuPont-Mitsui Polychemicals Co., Ltd. The cover layer has dimples (arranged as shown in FIG. 1) differing in type as shown in Table 1.

TABLE 1

| Type of dimples | Diameter | Depth | Number |
|---|---|---|---|
| I | 4.05 mm | 0.18 mm | 204 |
| II | 3.50 mm | 0.17 mm | 168 |
| III | 2.50 mm | 0.12 mm | 48 |
| Total | | | 420 |

The coating material used in Examples and Comparative Examples is explained in the following.

[Synthesis of Hydroxyl Group-Containing Polyester]

<Composition>

| | |
|---|---|
| 1,3-cyclohexane dicarboxylic acid | 138.0 pbw |
| Adipic acid | 157.0 pbw |
| Trimethylolpropane | 140.0 pbw |
| Neopentyl glycol | 65.0 pbw |
| 1,4-cyclohexanedimethanol | 58.0 pbw |
| Diethylene glycol | 30.0 pbw |

The components mentioned above were mixed and heated at 200 to 240° C. for 5 hours to give a polyester having an acid value of 4, a hydroxyl number of 170, and a weight-average molecular weight of 15,000. The thus synthesized polyester was dissolved in a 1/1 mixed solvent of xylene and methyl isobutyl ketone (MIBK) to give a varnish containing 70 wt % nonvolatile matter.

[Preparation of Coating Material]

A clear coating material A (35 wt % solids) was prepared from 100 pbw of varnish prepared above, 75 pbw of hexamethylene diisocyanate in adduct form as a non-yellowing polyisocyanate (Takenate D-160N (manufactured by Takeda Pharmaceutical Co., Ltd., having 12.6 wt % of NCO content and 75 wt % of solids) that is diluted with ethyl acetate so the NCO content is 8.5 wt % and the solid content is 50 wt %), dibutyltin dilaurate as cure catalyst, 130 pbw of butyl acetate/MIBK/propyleneglycol monomethyl ether acetate (PMA) [2/3/5 by weight] as solvent.

[Incorporation with Silica]

In Examples 1 to 4, the clear coating material A was incorporated with organosilica sol in an amount shown in Table 2. The organosilica sol is "Snowtex MEK-ST" (having an average particle diameter of 10 to 15 nm and containing 30% solids), from Nissan Chemical Industries, Ltd. In Comparative Example 2, 1 pbw of silica powder was incorporated into 99 pbw of the clear coating material A (35 wt % solids). The silica powder is "Sunsphere NP-100" having a particle diameter of 10 μm, from Asahi Glass Co., Ltd.

[Coating of Golf Ball]

A two-piece golf ball, which had been surface-treated with plasma, was stamped with a mark and then coated with the above-mentioned coating material. Coating was accomplished by using an automatic spray gun so that the coating film has a film thickness of 15 μm. The coating film was dried at 60° C. for 2 hours and then at room temperature for 16 hours. The thus obtained coating film was tested as follows.

[Test for Performance]

Color Tone

The golf ball having its surface covered with a coat layer was tested for color tone under the following conditions according to Hunter's Lab colorimetric system (L, a, b) by using a "multi spectro color meter MSC-IS-2DH" (from Suga Test Instruments Co., Ltd.)

<Test Conditions>

Field of view of light source: C-2
Reflection: d/8 (SEC)

Test for Resistance to Sand Abrasion

A 4-liter porcelain ball mill was filled with 15 coated golf balls and 1.5 liters of abrasive of "NUGGETMORUNDUM/SN" (size 5S) from Showa Denko K.K. After the ball mill was run for 2 hours, the golf balls were visually examined for film adhesion, gloss retention, and mark protection. The results are shown in Table 2.

Test for Resistance to Water Abrasion

A 4-liter porcelain ball mill was filled with 15 coated golf balls, 1.5 liters of abrasive of "NUGGETMORUNDUM/SN" (size 5S) from Showa Denko K.K and 1.5 liters of water. After the ball mill was run for 2 hours, the golf balls were visually examined for film adhesion, gloss retention, and mark protection. The results are shown in Table 2.

Test for Resistance to Repeated Hitting

A sample golf ball was hit 200 times with a driver at a head speed of 45 m/s by using a hitting machine made by True Temper Co., Ltd. After hitting, the golf ball was visually examined for the appearance of the coating film. The results are shown in Table 2.

TABLE 2

| | | Example | | | | Comparative Example | |
|---|---|---|---|---|---|---|---|
| | | 1 | 2 | 3 | 4 | 1 | 2 |
| Clear coating material A (pbw) | | 94 | 88 | 83 | 77 | 100 | 99 |
| Silica | Organosilica sol (pbw) | 6 | 12 | 17 | 23 | — | — |
| | Silica powder (pbw) | — | — | — | — | — | 1 |
| | Ratio to solids (wt %) | 5% | 10% | 15% | 20% | 0% | 3% |
| Appearance after coating | | Clear, glossy | Clear, glossy | Clear, glossy | Less glossy | Clear, glossy | Non-glossy |
| Film thickness (μm) | | 15.0 | 15.0 | 15.0 | 15.0 | 15.0 | 15.0 |
| Edge ratio (%) *1 | | 60% | 70% | 80% | 90% | 40% | 75% |
| Color tone | L | 94.87 | 95.00 | 95.00 | 94.93 | 94.87 | 90.90 |
| | a | 1.02 | 1.03 | 1.03 | 1.08 | 1.02 | 0.82 |
| | b | −9.77 | −9.88 | −9.88 | −9.91 | −9.77 | −9.30 |
| Test for resistance to sand | Adhesion *2 | ◉ | ◉ | ◉ | ◉ | ○ | ◉ |
| | Gloss retention *3 | ◉ | ◉ | ◉ | ◉ | ◉ | X |
| | Mark protection *4 | ◉ | ◉ | ◉ | ◉ | ○ | ◉ |
| Test for resistance to water | Adhesion *2 | ◉ | ◉ | ◉ | ◉ | Δ | ◉ |
| | Gloss retention *3 | ◉ | ◉ | ◉ | ◉ | ◉ | X |
| | Mark protection *4 | ○ | ◉ | ◉ | ◉ | X | ○ |
| Test for repeated | Adhesion *2 | ◉ | ◉ | ◉ | ◉ | ◉ | ◉ |
| | Mark protection *4 | ◉ | ◉ | ◉ | ◉ | ○ | ◉ |

TABLE 2-continued

|  | Example | | | | Comparative Example | |
|---|---|---|---|---|---|---|
|  | 1 | 2 | 3 | 4 | 1 | 2 |
| hitting | | | | | | |

Figure 2:
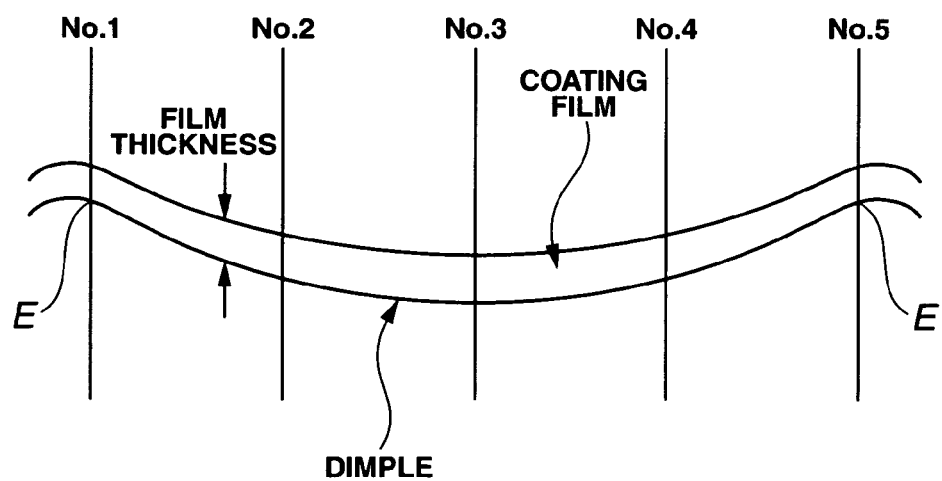
FIG. 2 is a diagram illustrating the thickness and edge ratio of coating film on a dimple.

Note to Table 2:
*1 Edge ratio (%)
A cross section of the coating film on a dimple is examined for film thickness in vertical direction at five points numbered from one end E to the other end E as shown in FIG. 2. The edge ratio (%) is calculated as below;
(an average value of film thicknesses at points No. 1 and No. 5)/(an average value of film thicknesses at points No. 2, No. 3, and No. 4) ×100(%).
The closer the edge ratio is to 100%, the more the film thickness is uniform.
*2 Adhesion
⊚: No peeling
○: Slight peeling on the raised part of the dimple
Δ: Peeling on the land of the dimple
X: Peeling over the entire surface
*3 Gloss retention
⊚: No change
○: Slight decrease
Δ: Almost glossless
X: Completely glossless
*4 Mark protection
⊚: No change
○: Slightly lost
Δ: Half lost
X: Completely lost As Table 2 shows, the coating film on the golf ball according to the present invention exhibits good adhesion, gloss retention, and mark protection in the test for resistance to sand abrasion and water abrasion, and it also retains a good appearance after repeated hitting, owing to incorporation with fine silica powder having an average particle diameter of 10 to 15 nm. By contrast, the sample in Comparative Example 1 is poor in adhesion and mark protection in the test for resistance to sand and water abrasion. The sample in Comparative Example 2, in which the coating material is incorporated with silica powder having an average particle diameter of 10 μm, is poor in gloss retention and appearance.

The invention claimed is:

1. A golf ball having a large number of dimples and a coating film formed on its surface, wherein said coating film is formed from a coating material incorporated with fine silica particle having an average particle diameter no larger than 200 nm, and said coating material is two-pack urethane of cure type composed of a polyol and a non-yellowing polyisocyanate, said polyol consisting mainly of hydroxyl group-containing polyester polyol having an alicyclic structure in its molecule.

2. The golf ball as defined in claim 1, wherein the fine silica particle has an avenge particle diameter no larger than 100 nm.

3. The golf ball as defined in claim 1, wherein the fine silica particle has an average particle diameter no larger than 50 nm.

4. The golf ball as defined in claim 1, wherein the coating material contains the fine silica particle in an amount of less than 30 wt %, based on the total amount of solids in the coating material.

5. The golf ball as defined in claim 1, wherein the fine silica particle is colloidal silica dispersed in an organic solvent.

6. The golf ball as defined in claim 1, wherein said hydroxyl group-containing polyester polyol having the alicyclic structure in its molecule is a polyester polyol obtained by reaction between a polyhydric alcohol having the alicyclic structure in its molecule and a polybasic acid having the alicyclic structure in its molecule, and the amount of the polyhydric alcohol having the alicyclic structure in its molecule is no less than 3 wt %, based on the total amount of the polyhydric alcohol, and the amount of the polybasic acid having the alicyclic structure in its molecule is no less than 5 wt %, based on the total amount of the polybasic acid.

7. The golf ball as defined in claim 6, wherein said polyhydric alcohol having the alicyclic structure in its molecule is selected from the group consisting of 1,3-cyclohexanedimethanol, 1,4-cyclohexanedimethanol, and mixtures thereof.

8. The golf ball as defined in claim 6, wherein said polybasic acid having the alicyclic structure in its molecule is at least one compound selected from the group consisting of tetrahydrophthalic acid, hexahydrophthalic acid, 1,3-cyclohexanedicarboxylic acid, and 1,4-cyclohexanedicarboxylic acid.

9. The golf ball as defined in claim 1, wherein an index to evaluate the uniformity of the coating film is an edge ratio, and the edge ratio of said coating film is no lower than 50%.

10. A golf ball having a large number of dimples and a coating film formed on its surface, wherein said coating film is formed from a coating material incorporated with fine silica particle having an average particle diameter no larger than 200 nm, and the coating material is two-pack urethane of cure type composed of a polyol and an elastic-modified polyisocyanate, said polyol consisting mainly of acrylic polyol,
wherein said elastic-modified polyisocyanate is an NCO-terminated prepolymer which is formed by a urethane reaction between diisocyanate as a monomer and an elastic active hydrogen-containing compound.

11. The golf ball as defined in claim 10, wherein said elastic active hydrogen-containing compound is at least one compound selected from the group consisting of polyester polyol, polycarbonate polyol, polyether polyol, polyolefin polyol, vegetable-derived polyol, and copolyols thereof.

* * * * *